(12) United States Patent
Boatwright, Jr.

(10) Patent No.: US 8,691,001 B2
(45) Date of Patent: Apr. 8, 2014

(54) FILTER BAG CLEANING SYSTEM

(75) Inventor: Richard Daniel Boatwright, Jr., Eugene, OR (US)

(73) Assignee: CSL Industrial Systems, Eugene, OR (US)

( * ) Notice: Subject to any disclaimer, the term of this patent is extended or adjusted under 35 U.S.C. 154(b) by 45 days.

(21) Appl. No.: 13/494,689

(22) Filed: Jun. 12, 2012

(65) Prior Publication Data

US 2013/0327213 A1 Dec. 12, 2013

(51) Int. Cl.
*B01D 46/04* (2006.01)

(52) U.S. Cl.
USPC ............... 96/421; 55/283; 55/284; 55/294; 55/302; 96/423

(58) Field of Classification Search
USPC ............. 55/282–303, 341.1–341.7, 361–382; 96/427, 428; 95/273–287
See application file for complete search history.

(56) References Cited

U.S. PATENT DOCUMENTS

| | | |
|---|---|---|
| 2,974,748 A | 3/1961 | Swanson |
| 3,277,633 A | 10/1966 | Smoot |
| 3,280,980 A | 10/1966 | King |
| 3,482,378 A | 12/1969 | Noland |
| 3,487,609 A | 1/1970 | Caplan |
| 3,543,481 A | 12/1970 | Pausch |
| 3,648,442 A | 3/1972 | Bourne |
| 3,695,007 A | 10/1972 | Farnworth |
| 3,793,811 A | 2/1974 | Bourne |
| 3,832,832 A | 9/1974 | Hoon, Jr. |
| 3,951,627 A | 4/1976 | Barr, Jr. et al. |
| 4,022,959 A | 5/1977 | Noland |
| 4,097,254 A | 6/1978 | Noland |
| 4,157,899 A | 6/1979 | Wheaton |
| 4,233,041 A | 11/1980 | Noland |
| 4,293,320 A | 10/1981 | Robinson |
| 4,306,890 A | 12/1981 | Gustavsson et al. |
| 4,539,025 A | 9/1985 | Ciliberti et al. |
| 4,544,389 A | 10/1985 | Howeth |
| 4,655,799 A | 4/1987 | Bosworth et al. |
| 4,854,951 A | 8/1989 | Stephenson |
| 4,878,926 A | 11/1989 | Goodrich |
| 5,116,395 A | 5/1992 | Williams |
| 5,421,845 A | 6/1995 | Gregg et al. |
| 8,029,583 B2 | 10/2011 | Ferguson et al. |
| 2003/0221996 A1 | 12/2003 | Svoronos et al. |
| 2007/0039290 A1* | 2/2007 | Lee ................................ 55/302 |

OTHER PUBLICATIONS

Zero-Max Inc., Linear Motion Control, Roh/Lix Linear Actuator, on-line product catalog, http://www.zero-max.com/rohlix-linear-actuators-c-24-I-en.html.

* cited by examiner

*Primary Examiner* — Duane Smith
*Assistant Examiner* — Thomas McKenzie
(74) *Attorney, Agent, or Firm* — Stolowitz Ford Cowger LLP

(57) ABSTRACT

A baghouse cleaning system comprises an elongated air accumulator configured to retain pressurized air and extend over a row of filter bags. An elongated air tube extends along the air accumulator and venturis extend from the air tube. The venturis blow pressurized air streams down into the filter bags to remove particles attached to an outside filter bag surface. A valve fluidly couples the air accumulator to the air tube and an actuator is configured to move the cleaning arm linearly over different rows of the filter bags. A sensor may determine when the filter bags need to be cleaned based on a measured air pressure. A controller can actuate the cleaning arm to clean the filter bags based on preprogrammed cleaning patterns, the amount of measured air pressure, and/or other detected environmental conditions.

10 Claims, 6 Drawing Sheets

FILTER BAG CLEANING SYSTEM

BACKGROUND

A facility may launch particulates into the air while manufacturing or processing products. The particulates may comprise dust, wood, metal, other organic or inorganic materials, or the like, or any combination thereof. Baghouses are used for removing the particulates from the air. A fan pulls the contaminated air from the facility into the baghouse and through filter bags. An outside surface of the filter bags collect the particulates while the filtered air continues up through the filter bags and out a clean air chamber of the baghouse to the fan.

A cleaning system removes the particulates that have accumulated on the outside surface of the filter bags. Pressurized air is shot down into an inside center section of the filter bags. The pressurized air briefly reverses the air flow through the filter bags causing the filter bags to slightly expand and shake off the particulates that accumulated on the outside filter bag surface. The particulates fall down into a collection chamber and are transported to a waste facility.

Baghouse cleaning systems are generally complex, expensive to install and operate, and inefficient. For example, circular cleaning systems may rotate in a circle around a center location inside of a round baghouse structure. The cleaning system may clean different subsections of filter bags at one time and then rotate to next subsection. Circular baghouse cleaning systems are relatively complex and use a complex series of tubes and valves to blow air into the individual filter bags. The complexity of the cleaning system adds to the overall cost and maintenance of the baghouse.

Round baghouses may also underutilize overall cleaning capacity. For example, a square or rectangular space is typically allocated within or next to the facility for the baghouse structure. However, the circular arrangement of the filter bags and cleaning system do not utilize the squared corner sections of the allocated baghouse space. The circular baghouse has reduced air filtering capacity since only a circular subportion of the available space is used for retaining filter bags.

DETAILED DESCRIPTION

Figure 1:
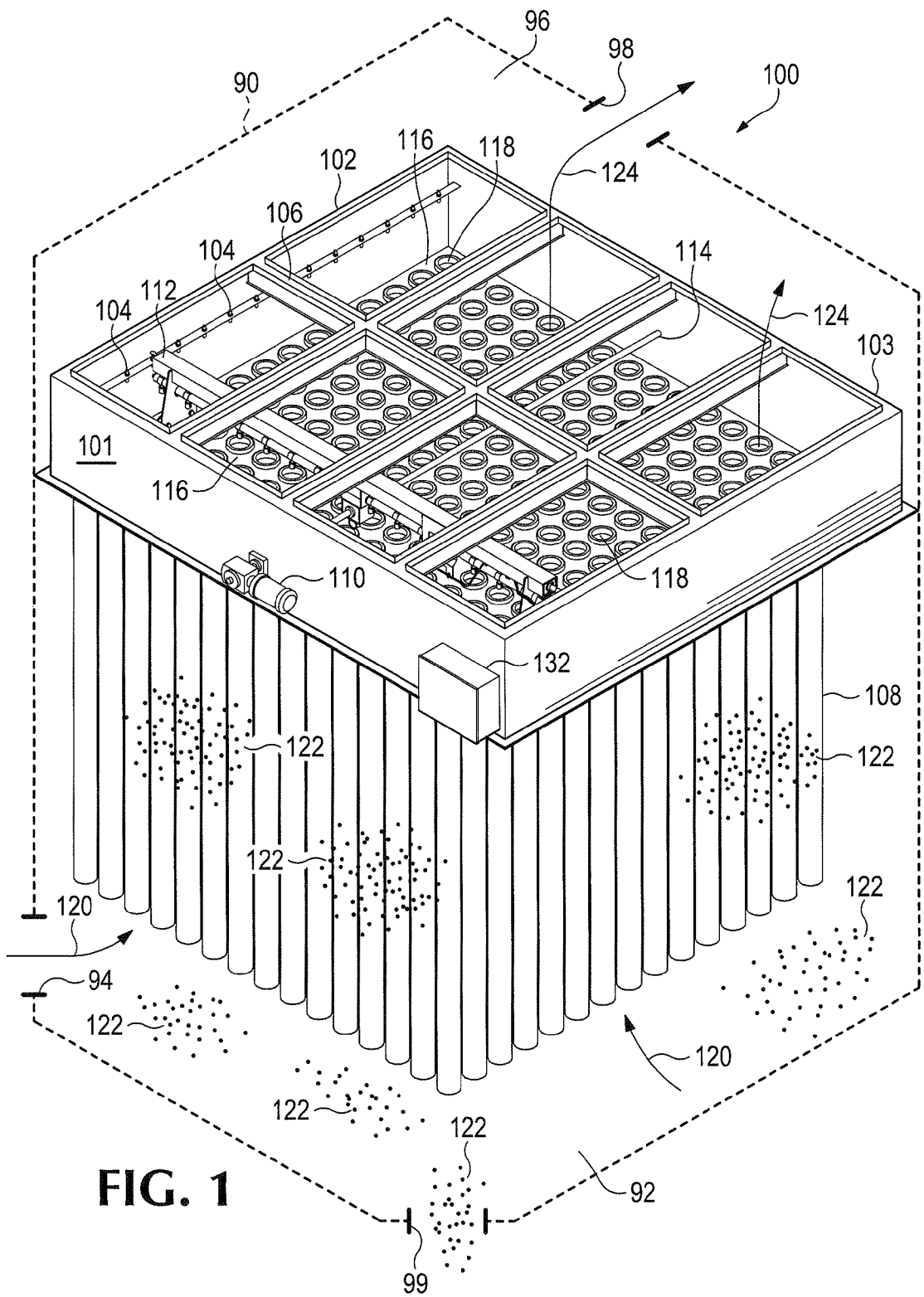
FIG. 1 depicts a perspective isolated view for a portion of a baghouse.

FIG. 1 depicts an example of a baghouse 90 comprising a frame structure 102 that holds filter bags 108 vertically above a lower chamber 92. Filter bags 108 may have a circular cross-section and comprise a wire-reinforced internal cage covered by a fabric with a closed bottom end and an open top end. It should be understood that other baghouse configurations may exist and the cleaning system described below may be modified to operate within these other baghouse configurations.

A cleaning system 100 operates within baghouse 90 and removes particulates 122 that may accumulate on the exterior surface of filter bags 108. Cleaning system 100 may comprise a cleaning arm 112 that extends above the top ends of filter bags 108. Proximity sensors 104 may be located and extend along a side of frame structure 102 having beams 106. Each proximity sensor 104 may be aligned next to a different row of filter bags 108. A shaft 114 is attached at a center location of cleaning arm 112 and causes cleaning arm 112 to move linearly between a front end 101 of frame structure 102 and a back end 103 of frame structure 102. A front end of shaft 114 is attached to a motor 110 and a rear end of shaft 114 is rotatably attached to back end 103 of frame structure 102.

A fan (not shown) pulls air 120 with particulates 122 through inlet 94 into lower chamber 92 below filter bags 108. In one example, air 120 may come from a facility that generates particulates 122 during a manufacturing or service process. However, air 120 and the carried particulates 122 can come from any source. Baghouse 90 operates as a cyclone forcing unfiltered air 120 up into and through filter bags 108. Particulates 122 are captured on an exterior surface of filter bags 108 and clean filtered air 124 is drawn up through the center section of filter bags 108, through holes 118 in a support plate 116, and out through an outlet 98 in an upper chamber 96 of baghouse 90.

As more particulates 122 accumulate on the outside filter bag surface, less air 120 can pass through filter bags 108 reducing the overall cleaning capacity of baghouse 90. Cleaning arm 112 shoots bursts of air into the center of filter bags 108 to remove particulates 122 attached to the outside filter bag surface. The bursts of air reverse air flow through a row of filter bags 108 blowing particulates 122 off of the outside surface and into a discharge opening 99. The air bursts may also slightly expand filter bags 108 outwardly away from their internal cages further breaking up and shaking off particulates 122 that may have attached and/or caked onto the filter bag outside surfaces.

Figure 2:
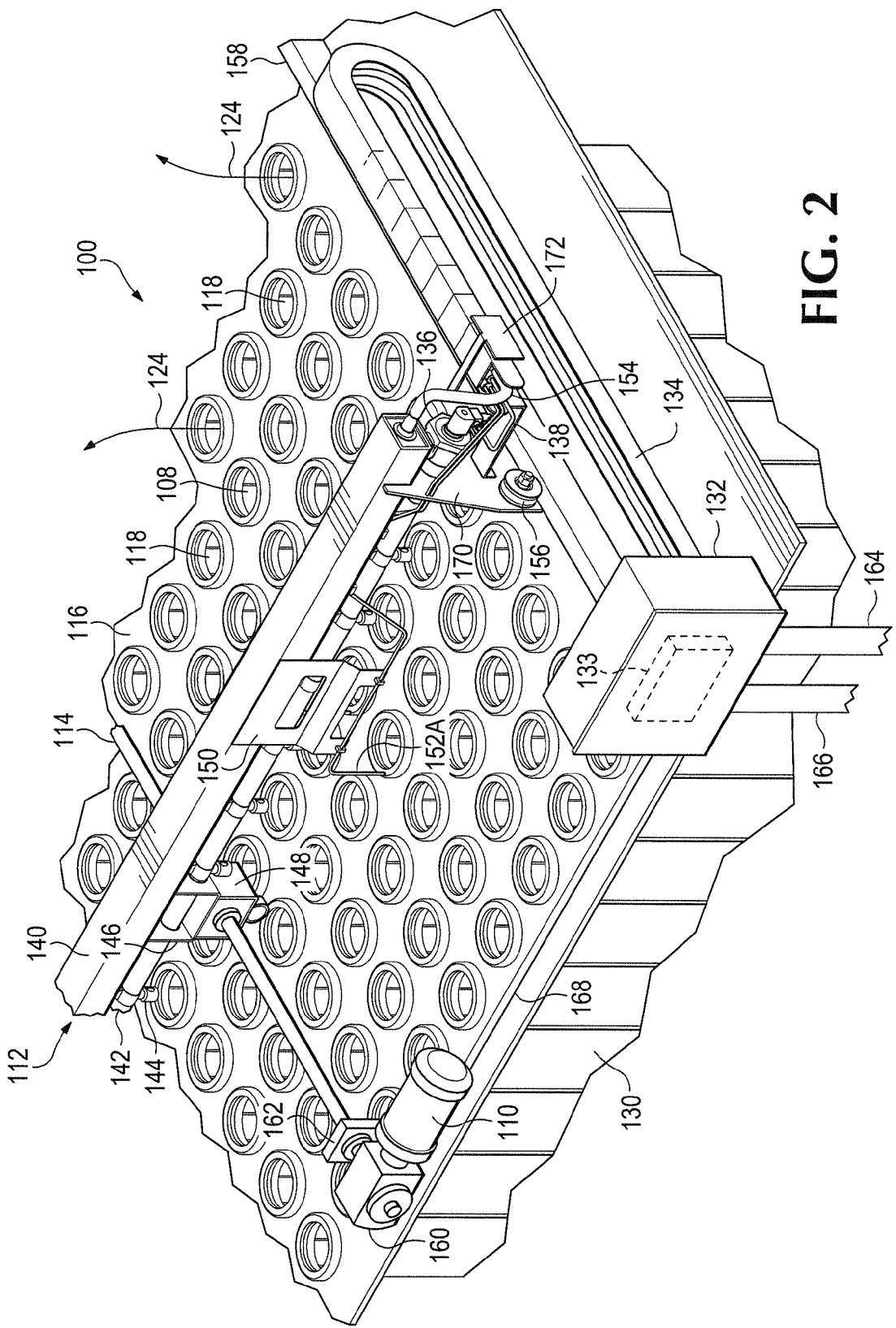
FIG. 2 depicts a partial perspective view of a filter bag cleaning system.

FIG. 2 depicts a perspective view for cleaning system 100. A housing 130 for baghouse 90 extends around support plate 116 and filter bags 108 and forms lower chamber 92 in FIG. 1. An upper housing is not shown but extends over support plate 116 and filter bags 108 and forms upper chamber 96 in FIG. 1. The open upper ends of filter bags 108 are attached around holes 118 in support plate 116. In one example, filter bags 108 and holes 118 may have circular cross-sectional shapes, but may have other shapes or dimensions.

Cleaning arm 112 comprises an accumulator 140 that extends across an entire row of filter bags 108. Accumulator 140 is alternatively referred to as an air header and in one example comprises a hollow beam with a square, rectangular, or round cross-sectional shape. Of course accumulator 140 may comprise other shapes. A diaphragm valve 136 fluidly connects accumulator 140 to a blow tube 142 that extends in parallel below accumulator 140. A row of venturis 144 extend down from blow tube 142 and are spaced apart to align over vertical centerlines for a row of filter bags 108. A flexible power track 134 contains an air tube 154 that directs compressed air from an air source into accumulator 140. A control line 138 in power track 134 is used by a controller 133 to control when diaphragm valve 136 opens and closes thus directing compressed air from accumulator 140 into blow tube 142 and out of venturis 144.

A front end of shaft 114 is rotatably connected to a gear converter 160 and rotatably retained by a bracket 162. Motor 110 rotates shaft 114 via gear converter 160 in either a clockwise or counter clockwise direction. An actuator 148 is held below accumulator 140 by a bracket 146 and converts rotary motion of shaft 114 into a linear motion moving cleaning arm 112 forward or backwards along shaft 114.

Motor 110 rotates shaft 114 causing actuator 148 to move cleaning arm 112 from a front row of filter bags 108, over intermediate rows of filter bags 108, until reaching a back row of filter bags 108. After reaching the back row of filter bags 108, motor 110 changes the rotational direction of shaft 114 causing actuator 148 to move cleaning arm 112 from the back row of filter bags 108, over the intermediate rows of filter bags 108, until reaching the front row of filter bags 108. Controller 133 can be programmed to provide any pattern for cleaning filter bags 108 with cleaning arm 112 and will be discussed in more detail below.

A pair of v-guide tracks 158 extend along opposite sides of plate 116. Top ends of support arms 170 support opposite lateral ends of accumulator 140. Bottom ends of support arms 170 attach to v-guide wheels 156 that roll on top of tracks 158. Linear movement of actuator 148 along shaft 114 moves cleaning arm 112 and causes wheels 156 to roll along tracks 158. Power track 134 bends backwards in response to linear movement of cleaning arm 112 towards the back end of support plate 116. Power track 134 bends forward in response to linear movement of cleaning arm 112 towards the front end of support plate 116. One example power track 134 may be manufactured by Gleason Reel®, P.O. Box 26, 600 S. Clark Street, Mayville, Wi. 53050; www.gleasonreel.com.

A pair of pitot tubes 152A and 152B (see FIG. 3) are held by brackets 150 on opposite front and back sides of accumulator 140. One example of pitot tubes 152 are manufactured by Dwyer Instruments, Inc., 102 Indiana Hwy, Michigan City, In. 46360. A back end of pitot tubes 152 are held in power track 134. Head ends of pitot tubes 152 can be positioned over different holes 118 and vertical centerlines for the different filter bags 108. For example, a front one of pitot tubes 152A may extend down from a front side of accumulator 140. Pitot tube 152A may be moved over one of filter bags 108 in a next forward row of filter bags prior to cleaning arm 112 moving in a forward direction over the next forward row of filter bags. A back one of pitot tubes 152B (see FIG. 3) may extend down from a back side of accumulator 140. Pitot tube 152B may be moved over one of the filter bags in a next rearward row of filter bags prior to cleaning arm 112 moving in a rearward direction over the next rearward row of filter bags.

Pitot tubes 152 may determine when different filter bags 108 need to be cleaned. As explained above in FIG. 1, air from a lower chamber of the baghouse flows up and through the center hollow portion of filter bags 108. Particulates in air 120 are trapped on the outside surface of filter bags 108 and filtered clean air 124 continues to pass up from the center portion of filter bags 108 and out through holes 118 (see FIG. 1).

The amount of air passing through filter bags 108 is reduced as the particulates continue to accumulate on the outside surface of filter bags 108. The associated amount of air pressure or air velocity within filter bags 108 also reduces as more particulates accumulate and cake onto the outside surface of filter bags 108. Different filter bags 108 may also accumulate different amounts of particulates. For example, filter bags 108 near inlet 94 (FIG. 1) in the lower chamber of the baghouse may capture more particulates than filter bags further away from inlet 94. Therefore, different filter bags may need different amounts of cleaning.

Pitot tubes 152 measure the amount of air pressure or air velocity in filter bags 108. For explanation purposes, the air pressure or air velocity measured by pitot tubes 152 will be referred to generally as air pressure. A particular filter bag 108 may be considered relatively clean when the air pressure measured by pitot tube 152 is relatively high. In this case, the row of filter bags containing the filter bag with the high associated air pressure may not be cleaned. For example, cleaning arm 112 may pass over the row of filter bags without releasing pressurized air from accumulator 140 into blow tube 142 and out venturis 144.

Cleaning arm 112 may be moved toward a next row of filter bags 108. A particular filter bag 108 in the next row may be considered relatively dirty when the air pressure measured by pitot tube 152 is relatively low. In this case, the next row of filter bags containing the filter bag with the low air pressure may be cleaned. For example, cleaning arm 112 may be moved over the next row of filter bags and pressurized air may be released from accumulator 140 into blow tube 142 and out venturis 144. The pressurized air output from venturis 144 reverse a direction of air flow through the row of filter bags from an upward and inward direction to a downward and outward direction. The reversed air flow blows particulates off the outside surface of the filter bags 108 causing the particulates to fall down into a discharge opening as explained above in FIG. 1.

Selective filter bag cleaning based on air pressure may reduce overall wear and maintenance since filter bags 108 may be cleaned less often and fewer reverse air pressure shocks may be applied to filter bags 108. Cleaning system 100 may also be more energy efficient since less energy may be needed for generating and shooting high pressure air out of cleaning arm 112 into filter bags 108.

A junction box 132 may connect a compressed air line 164, electrical control lines 166, and/or any other mechanical, electrical, or pneumatic cables or lines through power track 134 to cleaning arm 112. Junction box 132 may be connected to motor 110 by power and control cables 168. In one example, junction box 132 may contain a controller 133, sensors, air valves and/or any other elements needed for monitoring and controlling movement of cleaning arm 112 and controlling the release of compressed air out of venturis 144.

In another example, some or all of the electrical, mechanical, and/or pneumatic monitoring and control of cleaning arm 112, motor 110, diaphragm valve 136, and/or pitot tubes 152 may be performed remotely. For example, a computer system may be located in a control room and may monitor and/or control cleaning system 100 via electrical or pneumatic control lines 166 and air line 166.

Figure 3:
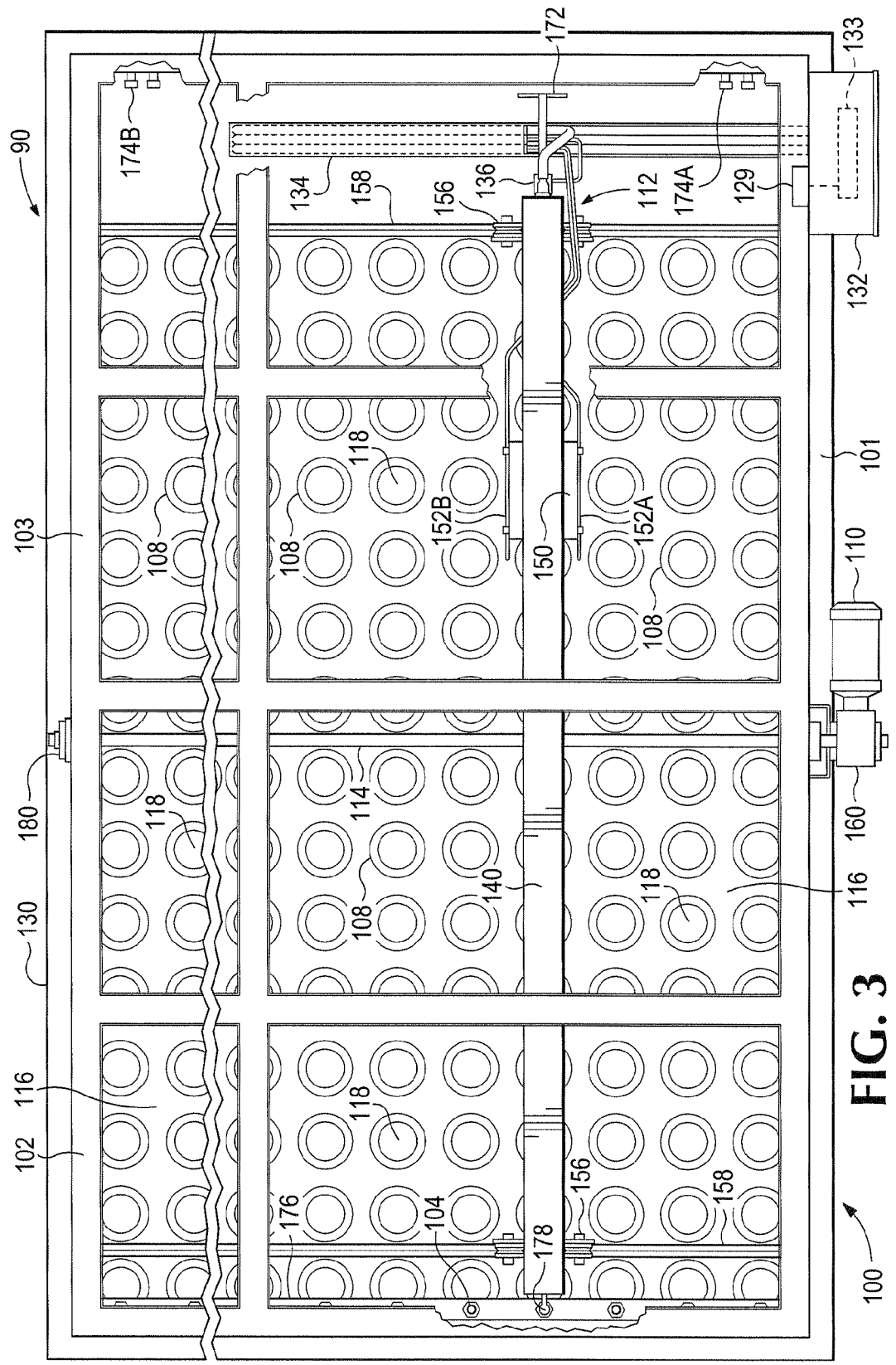
FIG. 3 depicts a top plan view of a filter bag cleaning system.

FIG. 3 depicts a top plan view of cleaning system 100. A position activator 172 extends out from a first lateral end of cleaning arm 112 and a position activator 178 extends out from an opposite lateral end of cleaning arm 112. A set of proximity sensors 174A are located next to front end 101 of frame structure 102 and a second set of proximity sensors 174B are located near back end 103 of frame structure 102. A series of proximity sensors 104 are located on a sensor mount 176 that extends along a side of frame structure 102. Each proximity sensor 104 is co-linearly aligned with a row of holes 118 in plate 116 and the attached filter bags 108. Wires (not shown) are connected from proximity sensors 174 and proximity sensors 104 to controller 133 located either in junction box 132 or located at a remote location.

Motor 110 may rotate shaft 114 in a clockwise or counter clockwise direction. In one example clockwise rotation of shaft 114 may cause actuator 148 (FIG. 2) to move cleaning arm 112 in the rearward direction from front end 101 of frame 102 to back end 103 of frame 102. Pitot tube 152B on the back side of accumulator 140 may pass over a next row of filter bags 108. Controller 133 may decide to clean the next row of filter bags based on the air pressure measured by pitot tube 152B.

Controller 133 detects when position activator 178 moves over proximity sensor 104 and is co-linearly aligned with the next row of filter bags. If cleaning is needed, controller 133 opens valve 136 releasing air from accumulator 140 into and out of blow tubes 142 and venturis 144 (FIG. 2). Controller 133 continues to move cleaning arm 112 toward back end 103 of frame structure 102 while cleaning different rows of filter bags 108.

Controller 133 detects when position activator 172 moves across proximity sensors 174B indicating that the next row of filter bags 108 is the last row in support plate 116. After moving over the last row of filter bags 108, controller 133 reverses motor 110 changing the rotational direction of shaft 114. Actuator 148 starts moving in an opposite direction along shaft 114 moving cleaning arm 112 from back end 103 of frame structure 102 toward front end 101 of support structure 102.

Pitot tube 152A may be used while cleaning arm 112 moves in the forward direction. Controller 133 monitors the air pressure for upcoming rows of filter bags with pitot tube 152A and the location of cleaning aim 112 via proximity sensors 104 and selectively cleans different associated rows of filter bags 108. Controller 133 detects when cleaning arm 112 reaches the front row of filter bags 108 when position activator 172 moves across proximity sensors 174A. Controller 133 may then direct motor 110 to rotate in the opposite direction and start moving cleaning arm 112 in the rearward direction again towards back end 103 of frame 102.

Only two pitot tubes 152A and 152B are shown in FIG. 3. However, any combination of pitot tubes 152 may be used. For example, multiple pitot tubes 152 may measure air pressure in multiple filter bags in the same row. The measured air pressures may be averaged and subsequent cleaning of the next row of filter bags may be determined based on the average measured air pressure. Any other type of air pressure measurement device may be used and any other device may be used for detecting dirty filter bags 108.

In another example, multiple pitot tubes 152 may measure air pressure in multiple different rows of filter bags 108 at the same time. A next row of filter bags 108 may be cleaned based on the average air pressure for the multiple different rows. In yet another example, rows of filter bags may be cleaned based on a change in measured air pressure between different adjacent rows of filter bags 108.

In yet another embodiment, venturis 144 may have individual valves fluidly controlling air flow from accumulator 140. Pitot tubes 152 may be located above each column of filter bags 108, or above different group of columns of filter bags 108. Filter bags 108 in individual rows, individual columns, and/or individual groups of rows or columns, may be cleaned based on the measured air pressure.

In yet another embodiment, pitot tubes 152 may not be used or may only be used during certain environmental conditions. For example, controller 133 may be loaded with a preprogrammed cleaning sequence. The programmed cleaning sequence may direct controller 133 to clean every other row of filter bags 108 when cleaning arm 112 is moving in the rearward direction from front end 101 of frame structure 102 toward back end 103 of frame structure 102. The programmed cleaning sequence may direct controller 133 to clean the other alternating rows of filter bags 108 when cleaning arm 112 is moving in the forward direction from rear end 103 toward front end 101 of frame structure 102. Of course, any cleaning pattern of rows and/or columns may be programmed into controller 133.

In yet another embodiment, filter bags 108 may be cleaned based on different environmental conditions. One or more sensors 129 may measure any combination of environmental conditions such as air pressure, time, temperature, humidity, or the like, or any combination thereof. Based on the sensor measurements, controller 133 may vary a speed of motor 110 and/or change the cleaning pattern for cleaning arm 112.

For example, filter bags 108 may need to be cleaned more frequently during certain humidity or temperature conditions. During the identified humidity or temperature conditions, controller 133 may increase a speed in which cleaning arm 140 is moved over rows of filter bags, may clean each row of filter bags instead of every other row or filter bags, and/or may blow air from the venturis into the filter bags 108 for longer periods of time. In another example, pitot tubes 152 are only used during the identified humidity or temperature condition.

Figure 4:
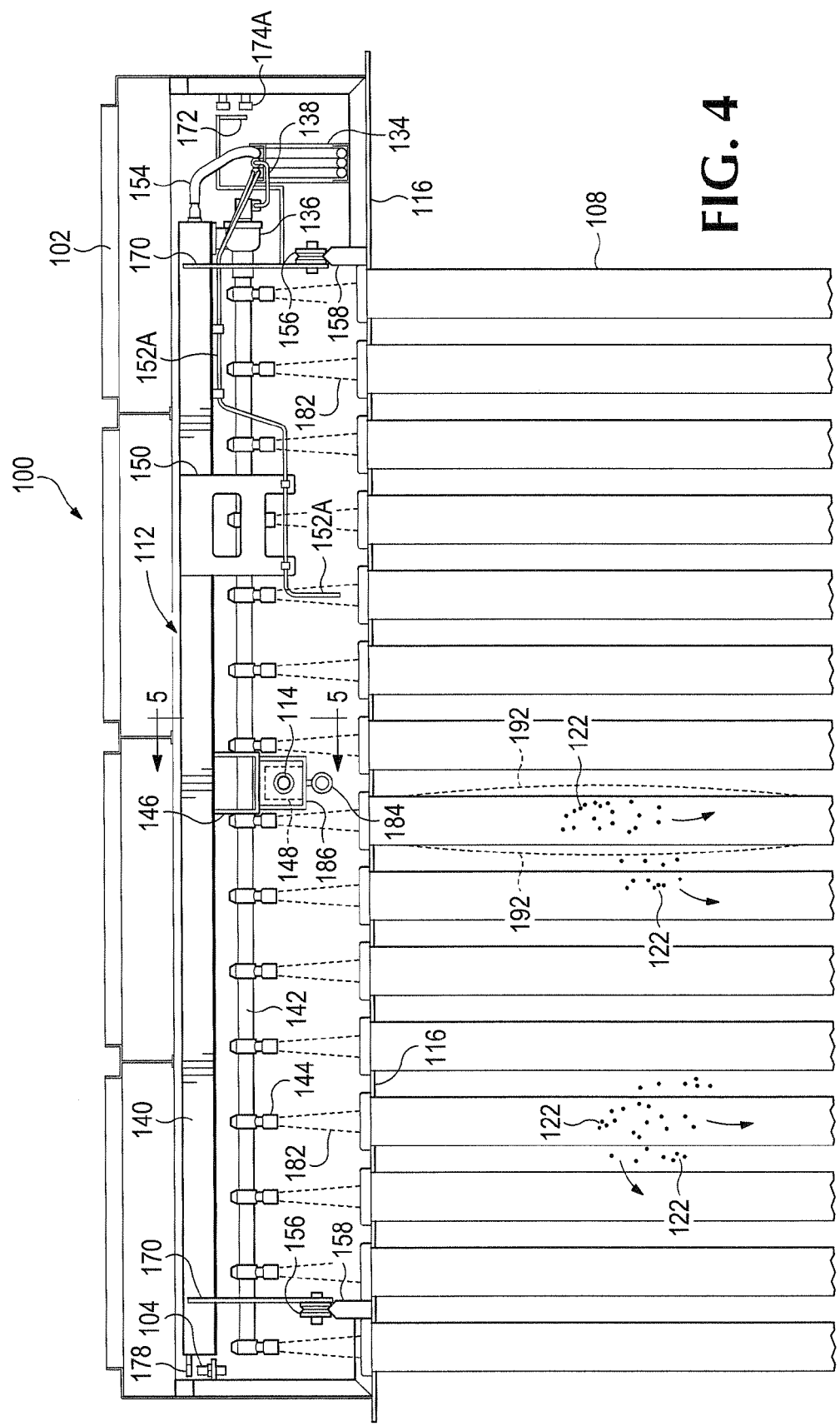
FIG. 4 depicts a side isolated view of a filter bag cleaning system.

FIG. 4 depicts a side view of cleaning system 100. Support plate 116 is shown supporting rows of filter bags 108 in vertical alignment. A top end of support arms 170 hold accumulator 140 above filter bags 108 and bottom ends of support arms 170 are rotatably coupled to wheels 156. Wheels 156 roll on v-tracks 158. Position activator 172 is shown located adjacent to proximity sensors 174A and as mentioned above are used by the controller to determine when cleaning arm 112 has reached a front end of the baghouse.

Power track 134 contains air hose 154 for supplying pressurized air to accumulator 140. Pitot tube 152A is shown positioned in front of the row of filter bags 108 currently being cleans by cleaning arm 112 and may have previously measured the air pressure for one of filter bags 108. Based on the measured air pressure, or based on a pre-programmed cleaning pattern, the controller may open valve 136 via control line 138. Valve 136 directs pressurized air from accumulator 140 into blow tube 142 and out venturis 144 as pressurized air streams 182. Air streams 182 reverse the air flow through filter bags 108 blowing and shaking particulates 122 off the outside surface of filter bags 108. Air streams 182 may quickly and briefly blow filter bags 108 into an expanded condition 192 that further crack, separate, and/or shake additional particulates 122 off of the outside surface of filter bags 108.

Actuator 148 is shown contained within an enclosure 186 and held below accumulator 140 by bracket 146. Actuator 148 moves in a forward or rearward direction along shaft 114 based on a rotational direction of shaft 114. In one example, enclosure 186 may be pressurized to keep dust from accumulating on actuator 148. A pressure gauge 184 may indicate the air pressure within enclosure 186.

Figure 5:
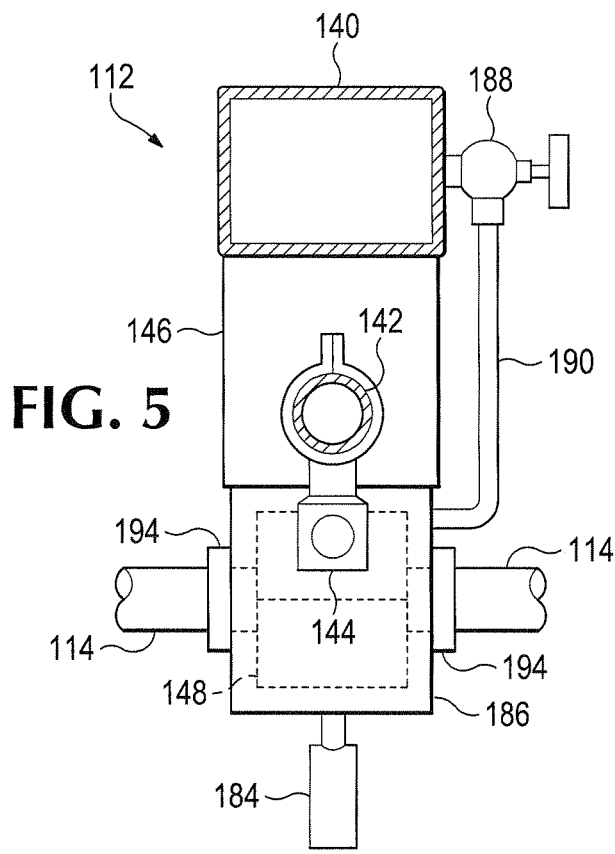
FIG. 5 depicts a side view of an actuator for moving the filter bag cleaning system.

FIG. 5 shows a side sectional view of cleaning arm 112. Accumulator 140 has a square or rectangular cross-sectional shape and a hollow internal section for storing pressurized air. Bracket 146 holds actuator 148 to a bottom side of accumulator 140. Blow tube 142 has a circular cross-sectional shape and a hollow internal section for receiving the pressurized air from accumulator 140. Venturi 144 is fluidly attached to blow tube 142 and blows the pressurized air stream into the filter bags.

As mentioned above, actuator 148 may be contained within an air tight enclosure 186. Washers 194 maintain a seal between shaft 114 and an internal chamber of enclosure 186. A valve 188 may direct pressurized air from accumulator 140 into the internal chamber of enclosure 186. The increased air pressure forces particles away from the internal chamber of enclosure 186 and actuator 148. Thus, actuator 148 may be exposed to less dust and require less maintenance and cleaning.

The amount of air pressure generated in enclosure 186 can be controlled by valve 188 and measured by pressure gauge 184. In one example, valve 188 is manually turned on and off. In another example, valve 188 may be electrically controlled to turn on and off based on feedback signals received from pressure gauge 184. For example, if pressure gauge 184 detects a drop in air pressure, valve 188 may be turned on and increase the air pressure within enclosure 186 to a preprogrammed level.

Figure 6:
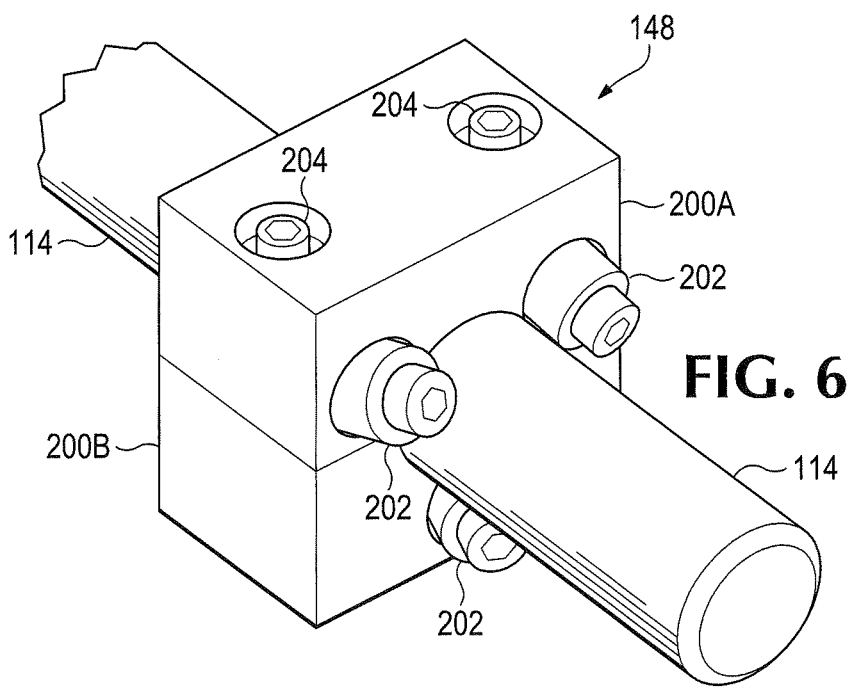
FIG. 6 depicts an example of an actuator.

FIG. 6 shows actuator 148 in more detail. Actuator 148 may comprise two blocks 200A and 200B that attach around upper and lower sides of shaft 114 and are held together with screws 204. Rolling ball bearings 202 are held in blocks 200 and trace a helix pattern along shaft 114 alternatively referred to as a rolling helix. Bearings 202 contact shaft 114 at an angle. When shaft 114 is rotated, bearings 202 trace out an imaginary screw thread, causing actuator 148 to travel linearly along shaft 114.

Thrust of actuator 148 along shaft 114 is determined by spring force of springs (not shown) that are located within blocks 200 and over screws 204. The tighter screws 204 clamp together blocks 200A and 200B, the tighter the springs are compressed together and the more firmly bearings 202 press against shaft 114. The tighter bearings 202 press against shaft 144, the more thrust actuator 148 asserts against shaft 114. Actuator 148 also allows bearings 202 to slip when a thrust capacity is exceeded, thereby offering protection to motor 110 and other baghouse components. One example of an actuator 148 is manufactured by Zero-Max, Inc. 13200 Sixth Avenue North, Plymouth, Minn. 55441-5509; WWW-.zero-max.com.

Figure 7:
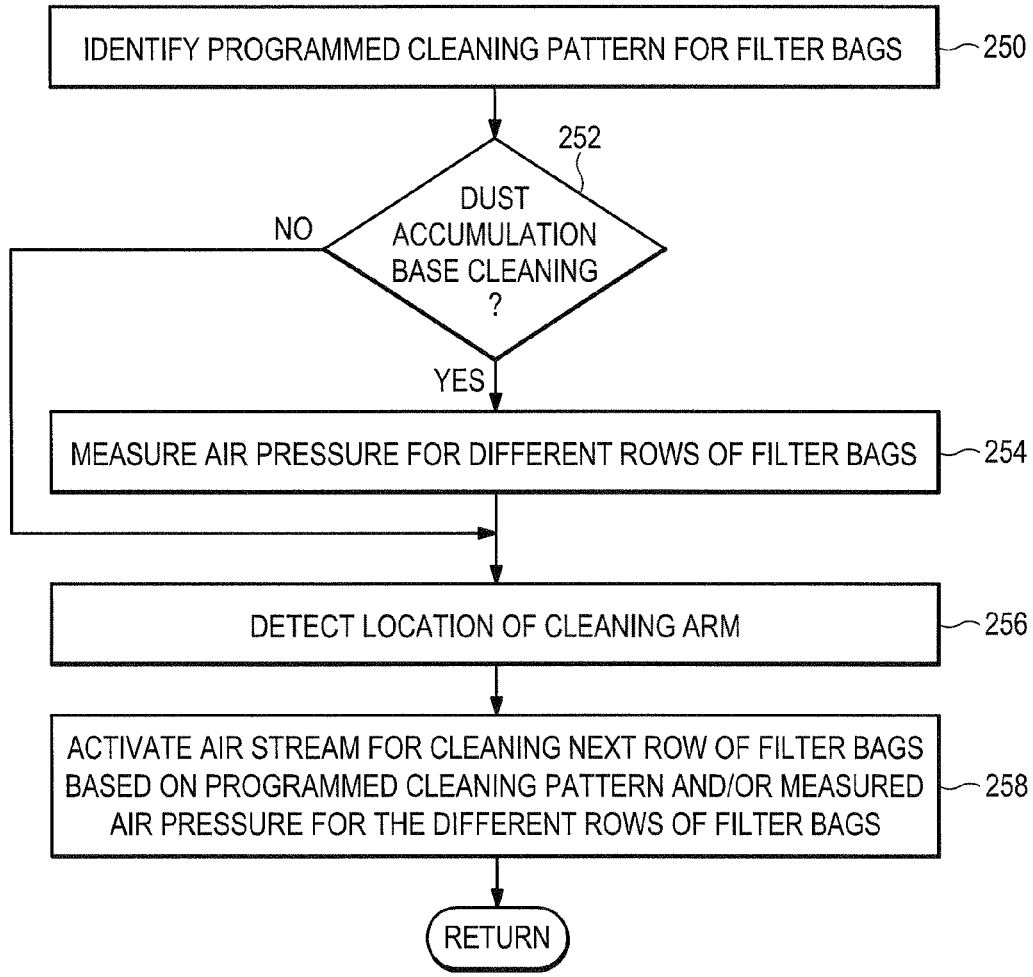
FIG. 7 depicts an example process for controlling a filter bag cleaning system.

FIG. 7 depicts an example of a process that may be performed for cleaning filter bags. In operation 250, the controller may identify a cleaning pattern for the filter bags. The cleaning pattern may be pre-programmed or may vary based on measured environmental conditions. For example, as mentioned above, a first cleaning pattern may comprise cleaning every other row of filter bags while the cleaning arm is moving in a rearward direction in the baghouse. The other set of alternating rows may be cleaned as the cleaning arm travels in a forward direction in the baghouse. The controller may direct motor 100 to rotate shaft 114 at a given rotational speed so that each row of filter bags is cleaned at a certain periodic rate.

Other programmed cleaning patterns may be stored in a memory and used by the controller based on changing environmental conditions. Based on air pressure, temperature, humidity, time of day, type of particulates, or the like, or any combination thereof, the controller may use a different cleaning pattern. For example, particulates may accumulate faster on the outside surface of filter bags 108 during different humidity or temperature conditions.

The controller may dynamically select a new cleaning pattern in response to detecting the particular humidity or temperature condition. For example, the new cleaning pattern may clean every row of filter bags while the cleaning arm is moving in the forward direction and the rearward direction. Accordingly, the controller may turn on the diaphragm valve and direct air streams through the venturis each time the cleaning arm moves over a new row of filter bags. In another example, the new cleaning pattern may indicate a different speed for the cleaning arm. Accordingly, the controller may send new signals to the motor to change a rotational speed that causes the cleaning arm to clean the filter bags at a different rate.

In operation 252, the controller may determine if dust accumulation based cleaning should be activated. Dust accumulation based cleaning may be pre-programmed into the controller or may be dynamically activated either manually or automatically. For example, an operator may press a button or send a command to the controller to activate dust accumulation based filter bag cleaning. In another example, the controller may automatically activate dust accumulation based cleaning based on an environmental condition, such as air pressure, air velocity, time, temperature, humidity, etc.

When dust accumulation based cleaning is enabled, the controller in operation 254 measures the air pressure/air velocity for a next row of filter bags as described above. For example, the controller may use the pitot tubes to measure the air pressure/air velocity for a particular filter bag in a next row of filter bags to be passed over by the cleaning arm. The measured air pressure/air velocity indicates an amount of dust/particulate accumulation on the filter bag. In operation 256, the controller monitors the current location of the cleaning arm. For example, the controller receives signals from the proximity sensors indicating when the cleaning arm is located over the next row of filter bags.

In operation 258, the controller may activate the diaphragm valve and release air streams from the venturis into the next row of filter bags based on any currently programmed cleaning pattern and/or any measured air pressure for the row of filter bags. For example, dust accumulation based cleaning may be disabled in operation 252. In this case, the controller may clean rows of filter bags based only on the cleaning pattern previously identified in operation 250.

In another example, dust accumulation based cleaning may be enabled in operation 252. The controller may normally clean rows of filter bags based on the cleaning pattern identified in operation 250. However, whenever the measured air pressure/air velocity for a next row of filter bags drops below a given threshold, the controller may clean the next row of filter bags regardless of the programmed cleaning pattern.

In yet another example, there may not be a preprogrammed cleaning pattern and the controller may dynamically determine when to clean each row of filter bags based on the measured air pressure/air velocity and/or may dynamically vary the cleaning pattern used to clean subsequent rows of filter bags based on current or previously measured air pressures/air velocities.

In another example, over time the controller may identify dust accumulation patterns on the filter bags. For example, based on differences in measured air pressure/air velocity, the controller may identify a specific section or group of filter bags that accumulate particulates faster than other sections or groups of filter bags. The controller may dynamically adjust the existing cleaning pattern to clean specific sections of filter bags more often or for longer periods of time than the other groups or sections of filter bags.

Cleaning system 100 may be less complex and less expensive to manufacture and operate than other baghouse cleaning systems. For example, only one air accumulator 140, one diaphragm valve 136, and one linear row of venturis 144 are needed for cleaning all of the different multiple rows of filter bags 108. Linear actuator 148 provides a simple single mechanism for moving cleaning arm 112 back and forth from the front to the rear of the baghouse. Air pressure may be maintained within an enclosure containing actuator 148 to reduce problems and maintenance needed for operating actuator 148. Dust accumulation monitoring provided by pitot tubes 152 allows more energy efficient cleaning of filter bags 108 while also reducing wear on filter bags 108. Proximity sensors 174 and 178 allow cleaning system 100 to use any programmable pattern for cleaning filter bags 108 and in combination with air pressure monitoring by pitot tubes 152 can dynamically clean any combination of filter bags based on any dust accumulation or other environmental condition.

Hardware and Software

Several examples have been described above with reference to the accompanying drawings. Various other examples are also possible and practical. The systems and methodologies may be implemented or applied in many different forms and should not be construed as being limited to the examples set forth above. Some systems described above may use dedicated processor systems, micro controllers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, embodiments of this disclosure may be implemented in a digital computing system, for example a CPU or similar processor. More specifically, the term "digital computing system," can mean any system that includes at least one digital processor and associated memory, wherein the digital processor can execute instructions or "code" stored in that memory. (The memory may store data as well.)

A digital processor includes, but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or FLASH memory embedded in an integrated circuit Central Processing Unit (CPU), network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably). Programs, or code, are most useful when stored in a digital memory that can be read by one or more digital processors. The term "computer-readable storage medium" (or alternatively, "machine-readable storage medium") includes all of the foregoing types of memory, as well as new technologies that may arise in the future, as long as they are capable of storing digital information in the nature of a computer program or other data, at least temporarily, in such a manner that the stored information can be "read" by an appropriate digital processor. The term "computer-readable" is not intended to limit the phrase to the historical usage of "computer" to imply a complete mainframe, mini-computer, desktop or even laptop computer. Rather, the term refers to a storage medium readable by a digital processor or any digital computing system as broadly defined above. Such media may be any available media that is locally and/or remotely accessible by a computer or processor, and it includes both volatile and non-volatile media, removable and non-removable media, embedded or discrete.

Having described and illustrated a particular example system, it should be apparent that other systems may be modified in arrangement and detail without departing from the principles described above. Claim is made to all modifications and variations coming within the spirit and scope of the following claims.

The invention claimed is:

1. An apparatus, comprising:
a elongated air accumulator configured to retain pressurized air and extend over a row of filter bags;
an elongated air tube extending along the air accumulator;
venturis extending from the air tube and configured to blow air into the filter bags; and
an accumulator valve fluidly coupling the air accumulator to the air tube; and
an actuator configured to move the air accumulator and air tube linearly over different individual rows of the filter bags;
wherein the air accumulator comprises a hollow beam.

2. The apparatus of claim 1, wherein the venturis extend underneath substantially the entire hollow beam.

3. The apparatus of claim 2, wherein the venturis are positioned on the air tube to substantially align with vertical center lines for all of the filter bags in the row of filter bags.

4. The apparatus of claim 1, further comprising:
a shaft extending from a front end to a back end of a structure retaining the filter bags; and
a motor configured to rotate the shaft, wherein the actuator is configured to move the air accumulator linearly between a front end and a back end of the shaft in response to the motor rotating the shaft.

5. The apparatus of claim 4, further comprising an enclosure attached to the air accumulator and containing the actuator.

6. The apparatus of claim 5, further comprising an air valve configured to direct pressurized air from the air accumulator into the enclosure.

7. The apparatus of claim 1, further comprising:
a sensor configured to measure air pressure for air flowing up and into the filter bags; and a controller configured to actuate the accumulator valve and cause pressured air streams to flow out of the venturis and into the filter bags based on the air pressure measured by the sensor.

8. The apparatus of claim 7, wherein the sensor comprises a first pitot tube extending in front of the air accumulator and a second pitot tube extending behind the air accumulator.

9. The apparatus of claim 1, further comprising:
proximity sensors located proximate to associated rows of filter bags;
a position activator located proximate to a lateral side of the air accumulator and configured to trigger the proximity sensors as the air accumulator moves over the associated rows of filter bags.

10. The apparatus of claim 9, further comprising a flexible power track coupling an air supply to the air accumulator and coupling a control line to the accumulator valve.

* * * * *

UNITED STATES PATENT AND TRADEMARK OFFICE
CERTIFICATE OF CORRECTION

Page 1 of 1

PATENT NO. : 8,691,001 B2
APPLICATION NO. : 13/494689
DATED : April 8, 2014
INVENTOR(S) : Boatwright, Jr.

It is certified that error appears in the above-identified patent and that said Letters Patent is hereby corrected as shown below:

In the Claims
Col. 10, Line 36, in Claim 1, delete "a elongated" and insert -- an elongated --, therefor.

Signed and Sealed this
Seventeenth Day of February, 2015

Michelle K. Lee
*Deputy Director of the United States Patent and Trademark Office*